May 22, 1956     E. W. WEAVER     2,746,740

CYCLE ANNEALING FURNACE

Filed Jan. 28, 1953

INVENTOR
*E. W. WEAVER*
BY
*Charles A. Haughey*

United States Patent Office 2,746,740
Patented May 22, 1956

2,746,740
CYCLE ANNEALING FURNACE

Ernest W. Weaver, Toledo, Ohio, assignor to Surface Combustion Corporation, Toledo, Ohio, a corporation of Ohio Application January 28, 1953, Serial No. 333,759

5 Claims. (Cl. 266—2)

This invention relates to cycle annealing furnaces for heat-treatment of metals and alloys to improve the physical properties thereof. Such furnaces are used for various steels having differing requirements for the desired heat treatment. This invention provides an improved continuous furnace for handling a variety of such cycle annealing requirements.

For a consideration of what I believe to be novel and my invention, attention is drawn to the following portion of the specification and the drawings and claims thereof.

Figure 1:
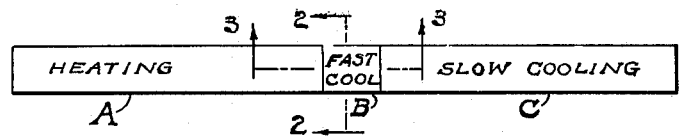
Fig. 1 is a plan of a furnace embodying the present invention.
Figure 2:
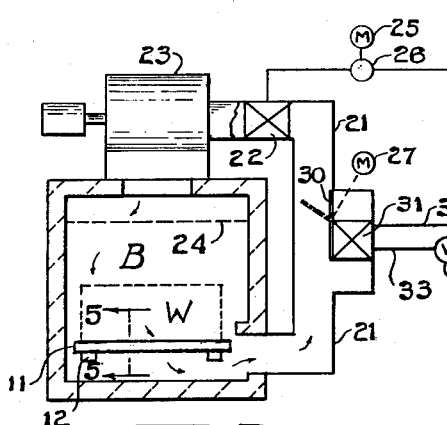
Fig. 2 is a transverse cross-sectional view of the furnace on line 2—2 of Fig. 1.
Figure 3:
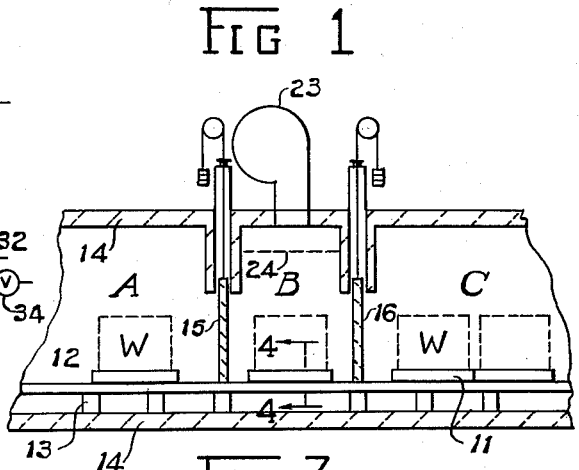
Fig. 3 is a longitudinal cross-sectional view of the furnace on line 3—3 of Fig. 1.

Referring to Fig. 1, the furnace comprises a heating zone A, a fast cool zone B and a slow cooling zone C in the order named as work progresses through the furnace. In the fast cool zone the work is contacted by a rapidly circulating cooling medium of such a composition as will constitute a protective atmosphere for the work, such as mild alloy steel, and this atmosphere will prevail throughout the length of the furnace. The atmosphere may be a specially prepared gas, or may be products of combustion from direct fired burners in the furnace.

Figure 5:
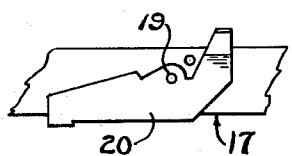
Fig. 5 is a sectional view of a detail taken on line 5—5 of Fig. 2.
Figure 4:
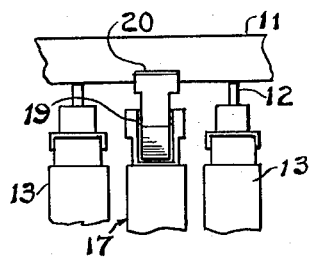
Fig. 4 is a sectional view of a detail taken on line 4—4 of Fig. 3.

Work indicated at W is loaded onto trays 11 and is conveyed on the trays through the furnace. There will be the customary heating means in the heating zone, and the temperature control means in the slow cooling zone may be either heaters or coolers as the case requires. The usual inlet and outlet doors, not shown, are provided at the inlet to and outlet from the furnace, and a pusher mechanism similar to that shown in some detail in Figs. 4 and 5 will be provided to push work into and through the heating zone.

The trays 11 ride through the furnace on rails 12 which are supported by piers 13 within the walls 14 of the furnace. The heating zone A is separated by a door 15 from the fast cool zone B, and the fast cool zone B and the slow cooling zone C are divided by a second door 16. Work on the trays 11 is advanced from a position at the end of the heating zone A by a pusher mechanism 17 including pusher gravity dogs 20 on pins 19. The pusher mechanism is moved in several short strokes so that each of several dogs on mechanism 17 pushes successively on the trays, and one tray is thus moved into the fast cool zone B while another is moved therefrom into zone C. The doors 15 and 16 are, of course, maintained open while the pusher is operating. If it is desired to move a tray from zone A to zone C without substantial fast cooling, the reciprocating pusher mechanism will, for example, automatically operate four strokes to move a tray from zone A to zone C after each tray is charged into zone A, whereas if a fast cool is desired, two strokes of the pusher moves one tray from zone A to zone B while moving a second tray from zone B to zone C, each time a tray is moved into zone A.

A typical annealing cycle using the fast cool zone C may be heating a steel such as SAE 4620 to 1750° F. in three hours and holding for about two hours in zone A, rapidly cooling to 1300° F. in about 20 minutes and holding at 1100° F. for 40 minutes in zone B, slow cooling from 1300° F. to 1200° F. in three hours, and to 900° F. in an additional five hours in zone C.

Such a cycle requires rapid cooling in zone B without affecting the temperature in the adjacent zones, and this is effected by isolating zone B by closing doors 15 and 16, and by rapidly circulating a cooling gas through the work in zone B. To obtain rapid cooling, yet avoid under cooling of the work in zone B it is necessary to provide for either cooling or heating of the rapidly circulating gas. To this end, the circulating gas medium in zone B passes through the work W on a tray 11 in the zone, under the tray and rails to a plenum thereunder leading to a recirculating duct 21, through a heater section 22, which may be directly fired or indirectly fired through radiant tubes as may be required, thence to the inlet of a recirculating fan 23 and from the outlet of the fan into a plenum above a distributing perforated wall 24 from which the recirculating gas again passes through the work.

When it is desired to heat the recirculating gas in duct 21, a motor 25 operated gas valve 26 is opened to pass fuel to the heater 22. When it is desired to cool the gas, a motor 27 operated damper 30 is moved from the closed position as shown in solid lines to the open position shown in broken lines, thus causing the atmosphere in the duct 21 to pass through a water-cooled cooler 31, water being supplied thereto through inlet and outlet water pipes 32 and 33. The outlet water temperature is controlled by outlet valve in 34 in the outlet pipe 33 to prevent excessive deposition of lime in the heat exchanger of the cooler 31.

Figure 6:
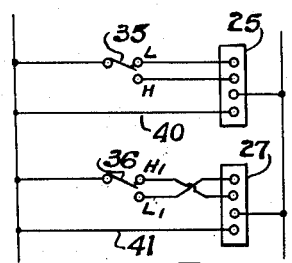
Fig. 6 is a schematic diagram of a control system for the furnace.

To automatically control the temperature cycle in the fast cool zone, a conventional thermocouple-responsive temperature control instrument having two contact points is used. It is wired as illustrated by Fig. 6 wherein the terminals of the gas and damper motors 25 and 27 are wired to the two contact points 35 and 36 in the control instrument, the motors being of conventional 180° travel design.

Figure 7:
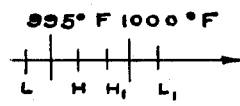
Fig. 7 is a line diagram of control temperature settings for the controls of Fig. 6.

In a cooling cycle where it is desired to rapidly cool work W in zone B, the fast cool zone, to 1000° F., then hold the work at 1000° until the next tray of work is moved into the fast cool zone, the first contact point 35 is set, as shown in Fig. 7, to control the motor 25 for the gas valve 26 at about 995° F. The contact point 35 will, on cooling, open circuit H and close circuit L to the gas valve motor 25 at about 994° F., causing the motor 25 to move 180° and open the gas valve 26. As the temperature in zone B rises to about 996° F. the contact point 35 moves, opening circuit L and closing circuit H to move the motor 25 another 180° and close the gas valve 26. This tends to control zone B at about 995° F. In the event that the temperature should rise above 996° F. as it usually will at least once due to heat carried in the load of work W, the second contact point 36 will move at about 1001° F. to open circuit L and close circuit $H_1$, causing motor 27 to move the damper 30 from the position shown in solid lines to that shown in broken lines, thus directing atmosphere over the cooler 31 in recirculating through the duct 21. Thereafter upon cooling of zone B, the second control point 36 will move at about 999° F. to close the circuit $L_1$ and open the circuit $H_1$, again causing the damper motor 27 to move 180°, and thus moving the damper 30 back to the position shown in solid lines. It is, of course, apparent that circuits L, H, $L_1$ and $H_1$ are the starter circuits of conventional 180° motors, and circuits 40 and 41 are the respective running circuits for the motors.

The above described control system is effective to produce a satisfactory fast cool cycle from an elevated temperature to a lower temperature such as 1000° F., and to hold at about that lower temperature, thus making possible in a continuous furnace an accurately controlled annealing cycle under varying conditions of loading work and timing of the pushing cycle.

Figure 8:
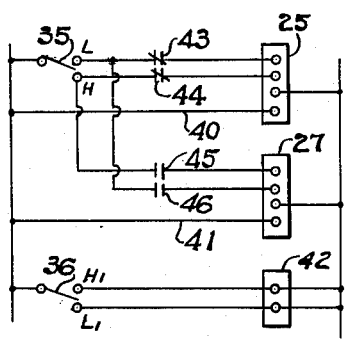
Fig. 8 is a schematic diagram of an alternate control system for the furnace.
Figure 9:
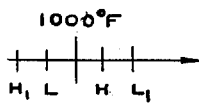
Fig. 9 is a line diagram of the control temperature settings for the controls of Fig. 8.

An alternate control system utilizing a relay 42 is shown in Figures 8 and 9 wherein the two control points 35 and 36 are each set at 1000° F., but the first, 35, is set to a narrow operating range of about 2° F. between its heating and cooling movement temperatures H and L, whereas the second, 36, is set to a wider swing of 6° F. between its heating and cooling circuits $H_1$ and $L_1$. Thus upon cooling, the first contact point 35 opens H and closes L at 999° F. to close the damper, the relay 42 being open and contacts 43 and 44 therein being open and contacts 45 and 46 therein being closed. If the temperature in zone B drops to 997° F., contact point 36 moves from circuit $H_1$ to $L_1$, closing the relay 42 and opening contacts 45 and 46 while closing contacts 43 and 44. This leaves the damper 30 closed, shifts circuits L and H from the damper motor 27 to the gas valve motor 25, and opens the gas valve 26. As the heater 22 then heats the recirculating atmosphere, and thus the work in zone B, the temperature therein will rise to 1001° F. and then control point 35 will move to close the gas valve 26 by opening L and closing H to the gas valve motor 25. If the temperature does not overshoot to 1003° F., the fast cool zone B will remain on control between 999° and 1001° F. by operation of the gas valve through the first control point 35. If the zone overheats on heating, the second control point 36 will move to open $L_1$ and close $H_1$ to open the relay and shift the first control point 35 from the gas valve motor 25 to the damper motor 27. Then upon cooling, the damper is subject to control from the first control point 35, and the temperature will be held between 999° and 1001° F. by using or not using the cooler 31 until the zone B temperature drops to 997° F., again causing the second control point 36 to shift the relay and again placing the gas valve motor under the control of the first control point 35.

While this alternate control system is a bit more complicated due to the use of the relay 42 in shifting the control point 35 from the gas valve motor 25 to the damper motor 27 and back, it is more accurate and thus for some purposes more desirable.

It will be appreciated that when the pusher mechanism 17 is designed to move a tray from zone A to zone B in two strokes and from zone B to zone C in two strokes, the entire furnace may be automatically controlled to make two strokes of the mechanism 17 each time zone A receives a new tray and one is removed from the discharge end of zone C to provide an annealing cycle utilizing the controlled fast cool zone B. Similarly, the furnace may be controlled to operate mechanism 17 four strokes per tray charged to zone A and removed from zone C, thus moving a tray from zone A to zone B and on to zone C without stopping. In such a case the temperatures in the slower rate of cooling would be excessive for the fan 23, hence this fast cool zone must be held at lower temperatures, and work moved rapidly therethrough so as to be relatively unaffected by its lower temperatures.

I claim:

1. In a furnace for cycle annealing work, in combination, means forming a heating chamber, means forming a slow cooling chamber, means forming a fast cool chamber therebetween, closure means for sealing the fast cool chamber from the heating and slow cooling chambers, means for recirculating atmosphere through the fast cool chamber, and means for cooling the recirculating atmosphere when the temperature in the fast cool chamber rises above a predetermined value and for heating the recirculating atmosphere when the temperature in the fast cool chamber falls below a predetermined value, to obtain rapid cooling and yet avoid under cooling of the work in the fast cool chamber.

2. In a furnace according to claim 1, the combination which comprises a temperature responsive means having first and second control points operable responsive to the temperature in the fast cool chamber, said first control point being adapted to control means for heating the recirculating atmosphere at a first temperature, and said second control point being adapted to control means for cooling the recirculating atmosphere at a second and higher temperature.

3. In a furnace according to claim 1, the combination which comprises a temperature responsive means having first and second control points operable responsive to the temperature in the fast cool chamber, said control points being operable at the same nominal temperature, the first control point having a narrower operating range than the second control point, and the second control point being adapted to operate a selector means for shifting the control of the first control point between means for heating the recirculating air and means for cooling the recirculating air.

4. In a furnace according to claim 1, the combination which comprises heating means in the path of the recirculating atmosphere which is activated when the temperature in the fast cool chamber falls below a predetermined value, a bypass for the recirculating atmosphere, means for cooling air flowing through said bypass, and a damper that is actuated to divert the recirculating air through said bypass when the temperature in the fast cool chamber rises above a predetermined value.

5. In a furnace according to claim 1, the combination which comprises intermittently operated means for moving a load of work rapidly from the heating chamber into the fast cool chamber and at the same time moving a load of work rapidly from the fast cool chamber into the slow cooling chamber, whereby the fast cool chamber may remain sealed from the adjoining chambers except during the brief periods required for such movement of the work.

References Cited in the file of this patent

UNITED STATES PATENTS

| 1,310,911 | John | July 22, 1919 |
| 2,075,385 | Wallis et al. | Mar. 30, 1937 |
| 2,217,452 | Peck | Oct. 8, 1940 |
| 2,414,312 | Lee | Jan. 14, 1947 |
| 2,637,671 | Pavitt | May 5, 1953 |